(12) United States Patent
Yang et al.

(10) Patent No.: US 12,437,450 B2
(45) Date of Patent: Oct. 7, 2025

(54) METHOD AND APPARATUS FOR RENDERING HAIR, COMPUTER STORAGE MEDIUM, ELECTRONIC DEVICE

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Chao Yang, Beijing (CN); Xiangjun Liu, Beijing (CN); Feng Du, Beijing (CN); Chaoyang Wu, Beijing (CN)

(73) Assignees: Beijing Wodong Tianjun Information Technology Co., Ltd., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 161 days.

(21) Appl. No.: 18/191,018

(22) Filed: Mar. 28, 2023

(65) Prior Publication Data

US 2023/0316597 A1 Oct. 5, 2023

(30) Foreign Application Priority Data

Apr. 1, 2022 (CN) .......................... 202210349186.6

(51) Int. Cl.
*G06T 11/00* (2006.01)
*G06T 7/90* (2017.01)
(Continued)

(52) U.S. Cl.
CPC .......... *G06T 11/001* (2013.01); *G06T 15/005* (2013.01); *G06T 2210/62* (2013.01)

(58) Field of Classification Search
CPC ..... G06T 11/001; G06T 15/83; G06T 15/005; G06T 15/503; G06T 15/506; G06T 15/55;
(Continued)

(56) References Cited

U.S. PATENT DOCUMENTS 8,094,151 B1 * 1/2012 Myers .................. G06T 15/503
345/592
9,865,076 B2 * 1/2018 Iwasaki ..................... G06T 1/20
(Continued)

FOREIGN PATENT DOCUMENTS

EP 3673463 B1 * 11/2023 ............. A63F 13/50

*Primary Examiner* — Wesner Sajous
(74) *Attorney, Agent, or Firm* — Qinghong Xu (57) ABSTRACT

A method for rendering hair is provided and includes: obtaining a first rendered result by performing transparent channel test rendering on a specified pixel point in a hair model, wherein the specified pixel point is a pixel point with a pixel depth value less than a preset depth threshold and a transparency channel value greater than a preset transparency threshold; obtaining a second rendered result by performing transparent channel hybrid rendering on a backlight pixel point of the hair model based on the first rendered result; obtaining a third rendered result by performing transparent channel hybrid rendering on a light-oriented pixel point of the hair model based on the second rendered result; obtaining a final rendered result of the hair model by hybridizing the first rendered result, the second rendered result and the third rendered result.

18 Claims, 5 Drawing Sheets

(51) Int. Cl.
   *G06T 15/00*   (2011.01)
   *G06T 15/83*   (2011.01)
   *G06V 10/60*   (2022.01)

(58) Field of Classification Search
   CPC .......... G06T 17/00; G06T 7/90; G06T 19/20; G06T 3/067; G06T 2207/20021; G06T 2210/62; G06T 15/205; G06T 13/80; G06T 13/40; G06T 3/4007; G06T 11/40; G06T 1/60; G06T 15/405; Y02D 10/00; G06V 10/60; H04N 13/117; H04N 13/128; H04N 13/344; H04N 13/351
   See application file for complete search history.

(56) References Cited

U.S. PATENT DOCUMENTS

| | | | | |
|---|---|---|---|---|
| 10,623,723 B2* | 4/2020 | Ratcliff | ................ | H04N 13/351 |
| 10,825,200 B2* | 11/2020 | Kondratov | ................ | G06T 7/90 |
| 11,483,543 B2* | 10/2022 | Ratcliff | ................ | H04N 13/117 |
| 2017/0032567 A1* | 2/2017 | Park | ................ | G06T 15/80 |

\* cited by examiner

METHOD AND APPARATUS FOR RENDERING HAIR, COMPUTER STORAGE MEDIUM, ELECTRONIC DEVICE

CROSS REFERENCE

The present disclosure is claims priority of Chinese Patent Application No. 202210349186.6, filed on Apr. 1, 2022 and entitled "Method and apparatus for rendering hair, computer storage medium, electronic device", which is incorporated herein by reference in its entity.

TECHNICAL FIELD

The present disclosure relates to a field of image processing technology, and more particularly, to a method for rendering hair, an apparatus for rendering hair, a computer storage medium and an electronic device.

BACKGROUND

With the development of computer rendering technology, digitization is becoming more and more widely used in movies, games and other fields.

In the related art, the following two solutions are mainly adopted when rendering hair: a fragment abandonment solution, i.e. a solution that abandons a region outside the hair and only renders a hair region, and edge jaggedness is relatively more in this solution; and a single-layer transparent solution, which cannot render the hair effect with rich layers.

In view of this, the field urgently needs to develop a new method and an apparatus for rendering the hair.

It should be noted that the information disclosed in the above BACKGROUND section is only used to enhance the understanding of the background of the present disclosure.

SUMMARY

According to a first aspect of the present disclosure, a method for rendering hair is provided and includes: obtaining a first rendered result by performing transparent channel test rendering on a specified pixel point in a hair model, wherein the specified pixel point is a pixel point with a pixel depth value less than a preset depth threshold and a transparency channel value greater than a preset transparency threshold; obtaining a second rendered result by performing transparent channel hybrid rendering on a backlight pixel point of the hair model based on the first rendered result; obtaining a third rendered result by performing transparent channel hybrid rendering on a light-oriented pixel point of the hair model based on the second rendered result; obtaining a final rendered result of the hair model by hybridizing the first rendered result, the second rendered result and the third rendered result.

In an embodiment of the present disclosure, the obtaining the first rendered result by performing transparent channel test rendering on the specified pixel point through a shader including: determining a half-angle vector according to a direction vector of a preset light source and a direction vector of a view angle of a camera; determining a sine index according to a tangent vector and the half-angle vector of each specified pixel point; determining a highlight color of each specified pixel point according to the sine index and a highlight intensity corresponding to each specified pixel point; obtaining the first rendered result by performing transparent channel test rendering on the specified pixel point according to the highlight color.

In an embodiment of the present disclosure, the determining the half-angle vector according to the direction vector of the preset light source and the direction vector of the view angle of the camera, including: acquiring a sum vector of the direction vector of the preset light source and the direction vector of the view angle of the camera; obtaining the half-angle vector by normalizing the sum vector.

In an embodiment of the present disclosure, the sine index is calculated by a following formula:

$$\sin(T,H) = \sqrt{1 - dot(T,H)^2}$$

where $\sin(T, H)$ denotes the sine index, T denotes the tangent vector, and H denotes the half-angle vector, $dot(T, H)$ denotes a dot product of T and H.

In an embodiment of the present disclosure, the determining the highlight color of each specified pixel point according to the sine index and the highlight intensity corresponding to each specified pixel point includes: performing an exponentiation operation by using the sine index as a base number and using the highlight intensity corresponding to the specified pixel point as an exponent; determining a result of the exponentiation operation as the highlight color of each specified pixel point.

In an embodiment of the present disclosure, the obtaining the final rendered result by hybridizing the first rendered result, the second rendered result and the third rendered result includes: obtaining a first hybrid result by performing a weighted operation on the first rendered result and the second rendered result; obtaining the final rendered result by performing a weighted operation on the first hybrid result and the third rendered result.

In an embodiment of the present disclosure, obtaining the final rendered result by hybridizing the first rendered result, the second rendered result and the third rendered result includes: obtaining a second hybrid result by performing a weighted operation on the second rendered result and the third rendered result; obtaining the final rendered result by performing a weighted operation on the second hybrid result and the first rendered result.

According to a second aspect of the present disclosure, an apparatus for rendering hair is provided and includes: a first rendering module, configured to obtain a first rendered result by performing transparent channel test rendering on a specified pixel point in a hair model, wherein the specified pixel point is a pixel point with a pixel depth value less than a preset depth threshold and a transparency channel value greater than a preset transparency threshold; a second rendering module, configured to obtain a second rendered result by performing transparent channel hybrid rendering on a backlight pixel point of the hair model; a third rendering module, configured to obtain a third rendered result by performing transparent channel hybrid rendering on a light-oriented pixel point of the hair model based on the second rendered result; the light-oriented pixel point is a pixel point directly facing a screen; a result output module, configured to obtain a final rendered result of the hair model by hybridizing the first rendered result, the second rendered result and the third rendered result.

According to a third aspect of the present disclosure, a computer storage medium is provided and includes computer program stored thereon, wherein when the computer program is executed by a processor, the method for rendering the hair of the above first aspect is implemented.

According to a fourth aspect of the present disclosure, an electronic device, wherein: a processor; and a memory for storing executable instructions of the processor; wherein the processor is configured to execute the method for rendering the hair of the above first aspect is implemented by executing the executable instructions.

It should be understood that the foregoing general description and the following detailed description are only illustrative and cannot limit the present disclosure.

BRIEF DESCRIPTION OF THE DRAWINGS

The drawings herein are incorporated into the specification and constitute a part of the specification, show embodiments that conform to the present disclosure, and together with the specification are to explain the principle of the present disclosure. Obviously, the drawings in the following description are only some embodiments of the present disclosure. For those skilled in the art, other drawings can be obtained from these drawings without creative work.

DETAILED DESCRIPTION

Example embodiments will now be described more fully with reference to the accompanying drawings. However, the example embodiments can be embodied in a variety of forms, and should not be construed as limitation of the examples set forth herein; rather, these embodiments are provided such that the present disclosure will be thorough and complete, and the concepts of the example embodiments will be fully given to those skilled in the art. The described features, structures, or characteristics may be combined in one or more embodiments in any suitable manner. In the following description, numerous specific details are provided in order to fully understand the embodiments of present disclosure. However, those skilled in the art will appreciate that one or more of specific details may be omitted when technical solutions of present disclosure is implemented, or other methods, components, devices, steps, etc. may be employed. In other instances, the widely-known technical solutions will not be shown or described in detail so as to avoid obscuring various aspects of present disclosure.

The terms "a", "an", "the", "said" and "at least one", when describing element/constituent/or the like as described and/or shown herein, are used to express the presence of one or more the element/constitute/or the like. The terms "include", and "have", as used herein, are intended to be inclusive, and mean there may be additional elements/constituents/or the like other than the listed elements/constituents/or the like. The terms "first" and "second" are only used as markers, and are not limited to the number of objects.

In addition, the drawings are only schematic illustrations of the present disclosure, and are not necessarily drawn to scale. Same reference numerals in the drawings denote same or similar parts, and thus their repeated description will be omitted. Some of the block diagrams shown in the drawings are functional entities and do not necessarily correspond to physically or logically independent entities.

In real-time rendering, an order of translucent rendering has always been a difficult problem to solve. When an object to be rendered is a collection of complex and interleaved triangular primitives, if depth data is written during rendering, a single pixel is only drawn once, and multiple layers of translucency will be covered or abandoned without performing hybrid rendering. If depth data is not written during rendering, pixels cannot be sorted by rendering pipeline.

In embodiments of the present disclosure, a method for rendering hair is firstly provided, which overcomes defect of poor hair rendering effect in the related art at least to a certain extent.

Figure 1:
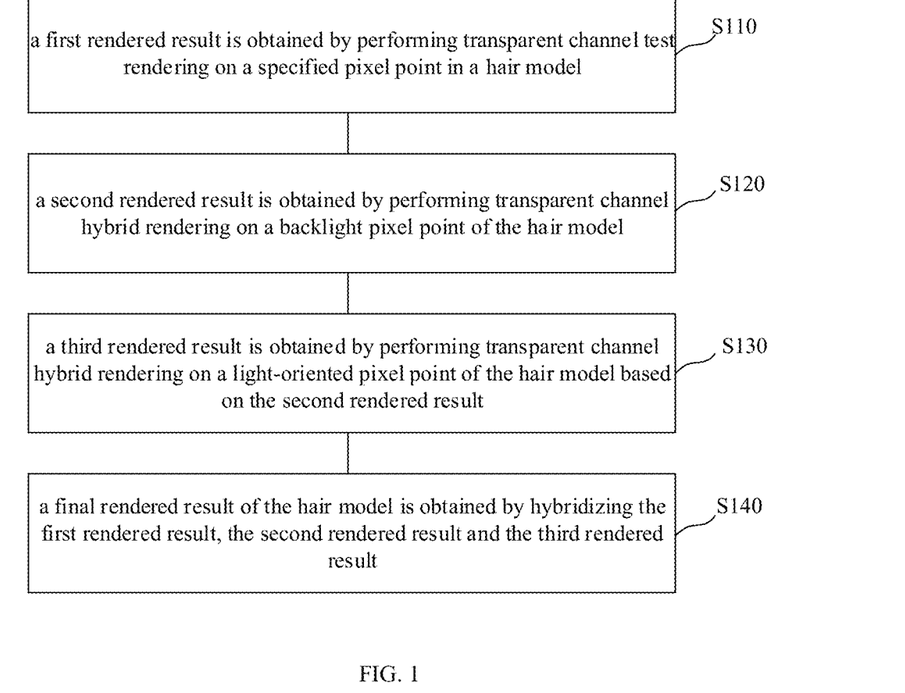
FIG. 1 shows a flow diagram of a method for rendering hair in an embodiment of the present disclosure.

FIG. 1 shows a flow diagram of a method for rendering hair in an embodiment of the present disclosure. The method for rendering hair may be performed a server that renders a model map.

Referring to FIG. 1, the method for rendering hair according to an embodiment of the present disclosure includes the following steps S110 to S140:

in step S110, a first rendered result is obtained by performing transparent channel test rendering on a specified pixel point in a hair model, the specified pixel point is a pixel point with a pixel depth value less than a preset depth threshold and a transparency channel value greater than a preset transparency threshold; in step S120, a second rendered result is obtained by performing transparent channel hybrid rendering on a backlight pixel point of the hair model based on the first rendered result;

in step S130, a third rendered result is obtained by performing transparent channel hybrid rendering on a light-oriented pixel point of the hair model based on the second rendered result;

in step S140, a final rendered result of the hair model is obtained by hybridizing the first rendered result, the second rendered result and the third rendered result.

In a technical solution provided by the embodiment shown in FIG. 1, on one hand, transparent channel test rendering is performed on the specified pixel point in the hair model (the specified pixel point is the pixel point with a pixel depth value less than a preset depth threshold and a transparency channel value greater than a preset transparency threshold) to obtain the first rendered result, which may ensure that depths of most pixels are sorted correctly. Further, based on the first rendered result, transparent channel hybrid rendering is performed on a backlight pixel point of the hair model to obtain the second rendered result, which enables to perform supplementary rendering on the abandoned backside pixel; based on the second rendered result, transparent channel hybrid rendering is performed on a light-oriented pixel point of the hair model to obtain the third rendered result, which enables to perform supplementary rendering on the abandoned light-oriented pixel point and ensures that the rendered result of a front side of a hair edge pixel is on top of a rendered result of a back side of the hair. On the other hand, by hybridizing the first rendered result, the second rendered result and the third rendered result, the rendered result with correct depth sorting, soft edge effect and rich layers may be obtained, thus achieving a more realistic rendering effect.

Specific implementation process of each step in FIG. 1 is described in detail below:

Before the step S110, a hair model may be modeled in 3D software (such as Maya, or 3DMAX and the like, which may be set according to the actual situation and not specially limited herein), so as to complete design and production of the hair model. Each pixel point in the hair model accurately corresponds to a surface of the hair model, and a gap between the pixel points is processed by the software for image smoothing difference. In the embodiment of the present disclosure, each pixel point in the hair model contains a RGB (Red-Green-Blue) value and an Alpha value (a transparent channel value).

The process for rendering hair model in the embodiments of the present disclosure involves transparent channel rendering, so the hair model used needs to have a transparent channel, such that a transparent channel value of each pixel point may be recorded using the transparent channel. The hair model adopts TGA (Tagged Graphics) format, PNG (Portable Network Graphics) format or TIF (Tag Image File) format.

In the hair model with transparent channels, each pixel point contains not only the corresponding RGB value, but also the corresponding transparent channel value. After acquiring the hair model, the terminal may read the RGB value and the transparent channel (Alpha) value of each pixel point.

For example, the pixel point in the hair model is denoted as (R, G, B, A), where R is a red channel value of the pixel point, G is a green channel value of the pixel point, B is a blue channel value of the pixel point, and A is a transparent channel value of the pixel point. Optionally, the values of R, G, B and A are 0 to 255 or 0 to 1, where 0 to 1 is converted from 0 to 255 (divided by 255).

It should be noted that when the above hair model is being produced, it is necessary to pre-bind a type of each pixel point (including a light-oriented pixel point and a backlight pixel point, where the light-oriented pixel point is a pixel point directly facing a preset light source direction in a virtual scene, and the backlight pixel point is a pixel point facing away from the preset light source direction in the virtual scene) to indicate whether each pixel point belongs to the backlight pixel point or the light-oriented pixel point of the hair model, so as to facilitate the subsequent rendering.

After the above hair model is produced, relevant data of the above hair model may be bound to a vertex buffer to be transmitted into a vertex shader of a GPU (Graphic Processing Unit), and the hair model is mapped to a 2D screen space through the vertex shader.

The vertex shader, also referred to as a vertex shader unit, is a program executed on the GPU of a graphics card, which replaces the transformation and lighting phases in the fixed function pipeline. Basic function of the vertex shader is to convert vertex coordinates of the model from a model space (also referred to as Object Space and Local Space, that is, when the model moves and rotates, the model space also moves and rotates with the model) into a homogeneous clipping space (clipping through the view frustum, there are two projection types for the view frustum design: one is an orthographic projection and the other one is perspective projection, the perspective projection is in a shape of a pyramid, and the orthogonal projection is in a shape of cuboid).

With the vertex shader, the following processing may be performed on the input hair model: by means of a matrix transformation, the hair model is converted from the model space to a world space, then to an observation space, further to a clipping space, and finally, the hair model is converted to the screen space for display.

After the hair model is converted to the 2D screen space, the hair model may be rasterized to be converted into each pixel fragment carrying information such as a texture coordinate in the display. The fragment is a product of rasterization process, and the rasterization is to transfer a primitive into a two-dimensional image. Each point of the two-dimensional image contains color, depth and texture data, and the point and the associated information is called a fragment. The fragment is equivalent to a pixel, but it has more information than the pixel, such as position, normal, color, texture coordinate, etc.

Furthermore, the rasterized pixel fragment may be input into the fragment shader to calculate lighting effect of each pixel and render the hair model. Specifically, referring to FIG. 1:

In step S110, a first rendered result is obtained by performing transparent channel test rendering on a specified pixel point in a hair model.

In this step, first, the specific pixel point whose transparency channel value is greater than a transparency threshold may be selected from the hair model, and then, in this rendering process, only the specified pixel point whose transparency channel value is greater than the transparency threshold is rendered, and the pixel whose transparency channel value is less than or equal to the transparency threshold is abandoned and is not rendered.

The transparent channel test rendering is a method to compare the transparent channel value of a pixel point with the preset transparency threshold, and determine whether to render the pixel point according to the comparison results. The comparison method involved in Alpha Test rendering includes Greater (rendering when the transparency channel value of the pixel point is greater than the preset transparency threshold), GEqual (rendering when the transparency channel value of the pixel point is greater than or equal to the preset transparency threshold), Less (rendering when the transparency channel value of the pixel point is less than the preset transparency threshold), LEqual (rendering when the transparency channel value of the pixel point is less than or equal to the preset transparency threshold) Equal (rendering when the transparency channel value of the pixel point is equal to the preset transparency threshold) and NotEqual (rendering when the transparency channel value of the pixel point is not equal to the preset transparency threshold). In the present disclosure, the comparison method used in the Alpha Test rendering is Greater.

Specifically, a depth writing function may be firstly turned on, which is to submit an instruction to the GPU to create a depth buffer. The depth buffer is a memory area dedicated to storing a depth value of each pixel point (drawn on the screen). The greater the depth value, the farther away from the camera. After the depth writing function is turned on, there is front-rear occlusion relationship between pixel points. Thus, when rendering, only a surface pixel point with a relatively less depth value may be rendered, while a pixel point with a relatively great depth value is abandoned without being rendered, so as to avoid losing the occlusion relationship between the pixel points.

Furthermore, the above first rendered result may be obtained by performing transparency channel test rendering on a pixel point with a pixel depth value less than a preset depth threshold and a transparency channel value greater than a preset transparency threshold through a fragment shader.

Figure 2:
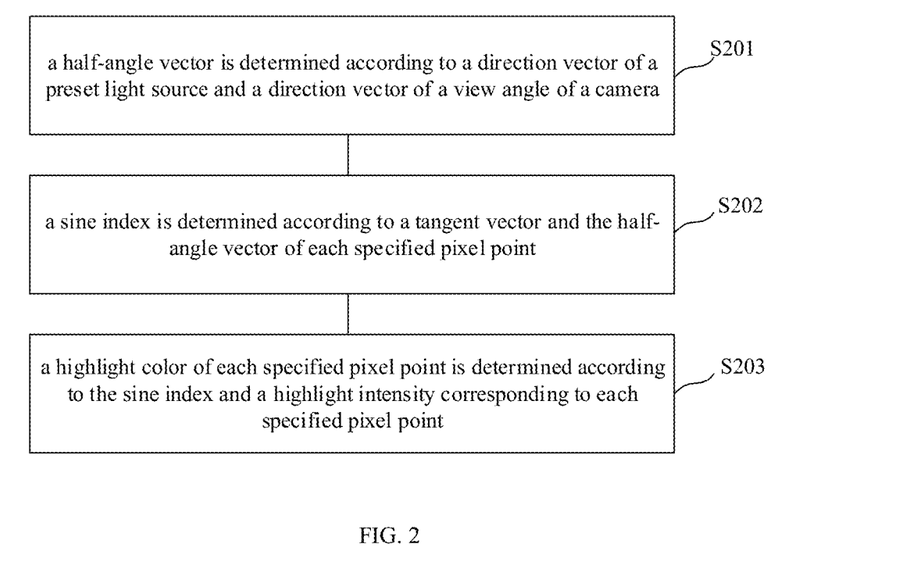
FIG. 2 shows a flow diagram of performing transparent channel test rendering on a specified pixel point through a fragment shader in an embodiment of the present disclosure.

Specifically, referring to FIG. 2, showing a flow diagram of performing transparent channel test rendering on a specified pixel point through a fragment shader in an embodiment of the present disclosure; including steps S201-S202:

In step S201, a half-angle vector is determined according to a direction vector of a preset light source and a direction vector of a view angle of a camera;

In this step, a tangent direction T of each pixel point of the hair model may be obtained, and a direction vector V of the view angle of camera may be obtained. Then, a sum vector (L+V) of the tangent direction T and the direction vector V of the view angle of camera may be obtained, and the sum vector may be normalized to obtain the half-angle vector H.

In step S202, a sine index is determined according to a tangent vector and the half-angle vector of each specified pixel point.

In this step, after the above half-angle vector is determined, a sine index may be determined according to the tangent vector and the half-angle vector of each specified pixel point.

Specifically, the above sine index may be calculated by the following formula 1: 2

$$\sin(T,H) = \sqrt{1 - dot(T,H)^2}$$

where sin(T, H) denotes the above sine index, T denotes the above tangent vector, and H denotes the above half-angle vector, dot(T, H) denotes a dot product of T and H.

In step S203, a highlight color of each specified pixel point is determined according to the sine index and a highlight intensity corresponding to each specified pixel point.

In this step, a highlight color of each specified pixel point may be determined according to the sine index and a highlight intensity corresponding to each specified pixel point.

Specifically, the highlight color corresponding to each pixel point may be calculated by the following formula 2:

$$spec = \sin(T,H)^{exponent}$$

where, spec denotes the above highlight color, exponent indicates the above highlight intensity, which is a pre-configured value with a value range from 1 to 1000, which may be set according to the actual situation and not specially limited herein.

For example, a program code corresponding to the step S203 may be written as: spec=pow (sinTH, exponential), pow is an exponentiation operation function.

In step S204, the first rendered result is obtained by performing transparent channel test rendering on the specified pixel point according to the highlight color.

Figure 3:
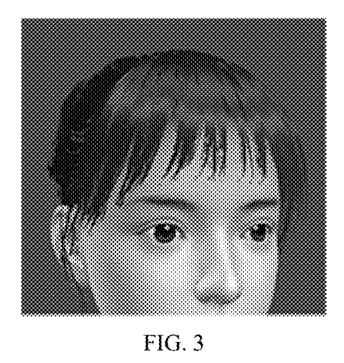
FIG. 3 shows a schematic diagram of a first rendered result in an embodiment of the present disclosure.

In this step, after obtaining the above highlight color, the transparent channel test rendering may be performed on the above specified pixel point according to the above highlight color, so as to obtain the above first rendered result. Referring to FIG. 3, FIG. 3 shows a schematic diagram of the above first rendered result obtained in the embodiment of the present disclosure. It may be seen from FIG. 3 that this rendering may ensure that the rendering depths of most pixels are sorted correctly.

Next, referring to FIG. 1, in step S120, a second rendered result is obtained by performing transparent channel hybrid rendering on a backlight pixel point of the hair model.

In this step, the backlight pixel point of the hair model may be filtered, and the transparent channel hybrid rendering is performed on the backlight pixel point of the hair model to obtain the second rendered result. The backlight pixel point is a pixel point facing away from the preset light source direction.

The transparent channel hybrid rendering is a method that uses a transparent channel value of a current pixel point as a hybrid factor and hybridizes the color value previously written to a cache to render the hybrid result. In the present embodiment, the hybrid rendering mode used for Alpha Blending rendering is Blend SrcAlphaOneMinusSrcAlpha, where SrcAlpha is a transparent channel value of the current pixel point, and OneMinusSrcAlpha is (1—the transparent channel value of the current pixel point). In the hybrid rendering mode, the RGB value of the hybridized pixel point is: the RGB value of the current pixel point * the transparent channel value of the current pixel point+the RGB value in the cache * (1—the transparent channel value of the current pixel point).

Specifically, the depth writing function may be turned off, and then the above steps S201-S203 are performed to determine the highlight color corresponding to each backlight pixel point, and the transparent channel hybrid rendering is performed on each backlight pixel point according to the highlight color corresponding to each backlight pixel point, so as to generate the above second rendered result.

Figure 4:
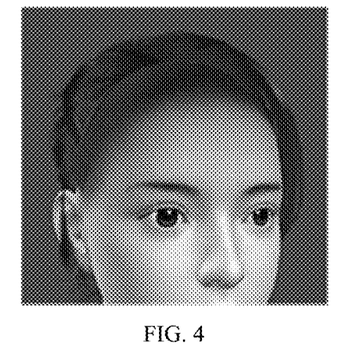
FIG. 4 shows a schematic diagram of a second rendered result in an embodiment of the present disclosure.

For example, referring to FIG. 4, and FIG. 4 shows a schematic diagram of the above second rendered result in an embodiment of the present disclosure. Referring to FIG. 4, it may be seen that through the rendering process in the step S120, supplementary rendering may be performed on the backside pixel that is abandoned in the step S110.

Next, referring to FIG. 1, in step S130, based on the second rendered result, transparent channel hybrid rendering is performed on a light-oriented pixel point of the hair model to obtain a third rendered result.

In this step, after the above second rendered result is obtained, the transparent channel hybrid rendering is performed on the light-oriented pixel point of the hair model based on the above second rendered result to obtain the third rendered result.

Specifically, vertex depth writing is turned off (at this time, the depth of each pixel point is the same by default, and there is no occlusion relationship, and when rendering, all selected pixel points may be rendered), and then the above steps S201-S203 are performed to generate a highlight color corresponding to each light-oriented pixel point, and the transparent channel hybrid rendering is performed on each light-oriented pixel point according to the highlight color corresponding to each light-oriented pixel point, so as to obtain the above third rendered result.

Figure 5:
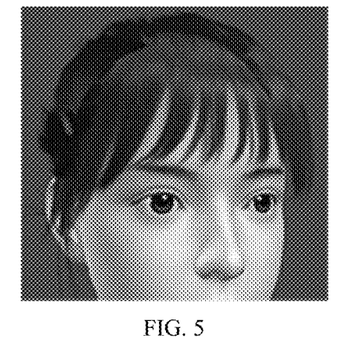
FIG. 5 shows a schematic diagram of a third rendered result in an embodiment of the present disclosure.

For example, referring to FIG. 5, FIG. 5 shows a schematic diagram of the above third rendered result in an embodiment of the present disclosure. Referring to FIG. 5, it may be seen that through the rendering process in the step S130, supplementary rendering may be performed on a front side pixel that is abandoned in the step S110, and the rendered result of a front side of a hair edge pixel is ensured to be on top of a rendered result of a back side of the hair.

It should be noted that sequences of the above steps S120 and S130 may be set according to the actual situation and not specially limited herein.

In step S140, a final rendered result of the hair model is obtained by hybridizing the first rendered result, the second rendered result and the third rendered result.

In this step, after obtaining the first, second and third rendered results, the first, second and third rendered results may be hybridized to obtain the final rendered result of the hair model.

Figure 6:
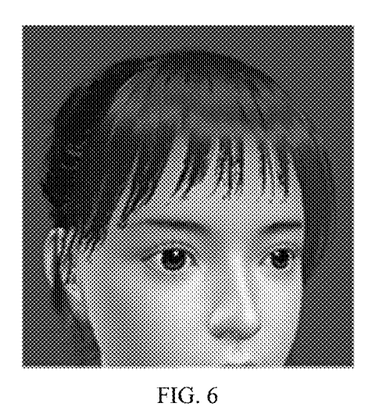
FIG. 6 shows a schematic diagram of a first hybrid result in an embodiment of the present disclosure.
Figure 7:
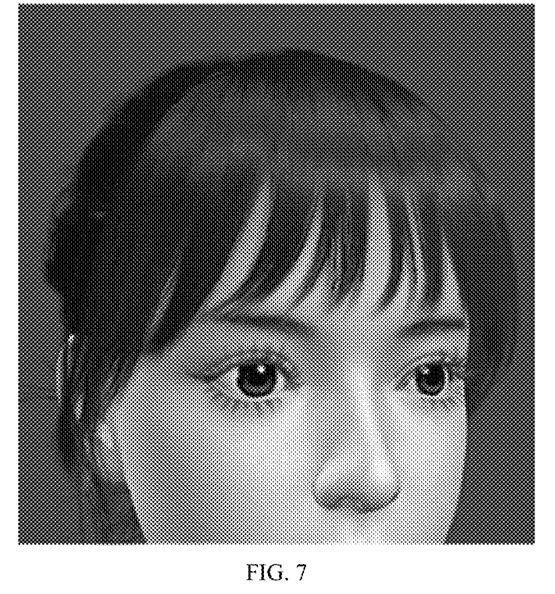
FIG. 7 shows a schematic diagram of a final rendered result in an embodiment of the present disclosure.

In an alternative implementation, a weighted operation may be performed on the above first and second rendered results first, to obtain a first hybrid result. For example, taking any pixel point X as an example, for example, if a first rendered result of pixel point X is ColorGenerated, a second rendered result of the pixel point X is ColorFrame, and a preset weight of the first rendered result is SrcAlpha (a decimal greater than 0 and less than 1), a preset weight of the second render result is 1-SrcAlpha, then the first hybrid result of the pixel point X may be expressed as: ColorGenerated*SrcAlpha+ColorFrame* (1-SrcAlpha). Referring to FIG. 6, FIG. 6 shows a schematic diagram of the above first hybrid result in an embodiment of the present disclosure, and then, referring to the above explanation, a weighted operation may be performed on the first hybrid result and the above third rendered result, to obtain the final rendered result. Referring to FIG. 7, FIG. 7 shows a schematic diagram of the above final rendered result in an embodiment of the present disclosure.

In another alternative implementation, a weighted operation may be performed on the above second and third rendered results first, to obtain the second hybrid result, and then a weighted operation may be performed on the second hybrid result and the above first rendered result, to obtain the final rendered result.

Figure 8:
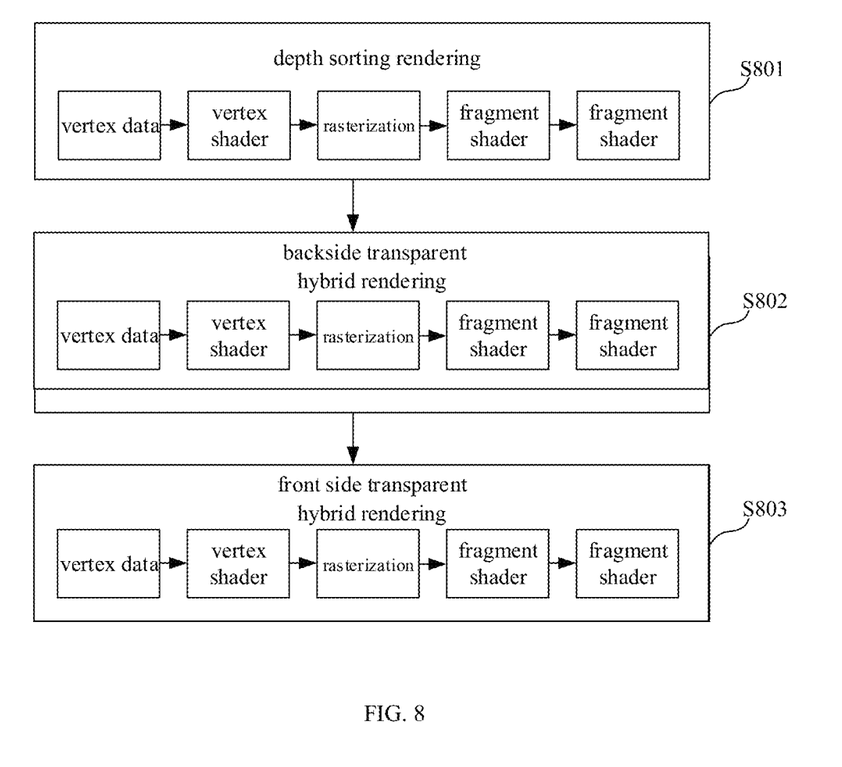
FIG. 8 shows an overall flow diagram of a method for rendering hair in an embodiment of the present disclosure.

Referring to FIG. 8, FIG. 8 shows an overall flow diagram of a method for rendering hair in an embodiment of the present disclosure, including steps S801-S803:

In step S801, a depth sorting rendering (i.e., the transparent channel test rendering in step S110, which includes inputting the vertex data of the hair model into the vertex shader for rasterization, and then inputting the rasterized pixel fragment into the fragment shader, and determining a rendering order of each pixel point according to a depth value, and performing the rendering step through the fragment shader);

In step S802, a backside transparent rendering (i.e., the transparent channel hybrid rendering in step S120, which includes inputting the vertex data of the hair model on the back side to the vertex shader for rasterization, and then inputting the rasterized pixel fragment into the fragment shader to perform the rendering step through the fragment shader);

In step S803, a front side transparent rendering (i.e., the transparent channel hybrid rendering in step S130, which includes inputting the vertex data of the hair model on the front side to the vertex shader for rasterization, and then inputting the rasterized pixel fragment into the fragment shader to perform the rendering step through the fragment shader).

Based on the above technical solution, the present disclosure may combine the advantages of correct sorting of the transparent channel test rendering and soft edges of transparent channel hybrid rendering, to obtain a rendered result with correct depth sorting, soft edge effect and rich layers, thus achieving a more realistic rendering effect.

Figure 9:
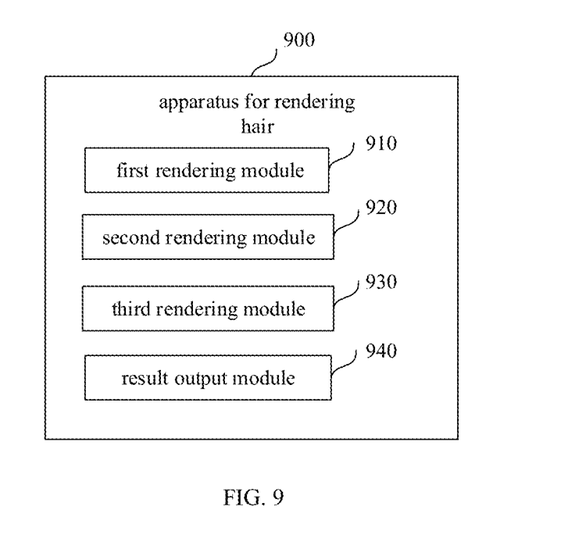
FIG. 9 shows a structure diagram of an apparatus for rendering hair in an embodiment of the present disclosure.

The present disclosure also provides an apparatus for rendering hair. FIG. 9 shows a structure diagram of an apparatus for rendering hair in an embodiment of the present disclosure. As shown in FIG. 9, the apparatus for rendering hair 900 may include a first rendering module 910, a second rendering module 920, a third rendering module 930, and a result output module 940.

The first rendering module 910, configured to obtain a first rendered result by performing transparent channel test rendering on a specified pixel point in a hair model, the specified pixel point is a pixel point with a pixel depth value less than a preset depth threshold and a transparency channel value greater than a preset transparency threshold;

the second rendering module 920, configured to obtain a second rendered result by performing transparent channel hybrid rendering on a backlight pixel point of the hair model;

the third rendering module 930, configured to obtain a third rendered result by performing transparent channel hybrid rendering on a light-oriented pixel point of the hair model based on the second rendered result;

the result output module 940, configured to obtain a final rendered result of the hair model by hybridizing the first rendered result, the second rendered result and the third rendered result.

In the embodiment of the present disclosure, the first rendering module 910 is configured to:

determine a half-angle vector according to a direction vector of a preset light source and a direction vector of a view angle of a camera; determine a sine index according to a tangent vector and the half-angle vector of each specified pixel point; determine a highlight color of each specified pixel point according to the sine index and a highlight intensity corresponding to each specified pixel point; obtain the first rendered result by performing transparent channel test rendering on the specified pixel point according to the highlight color.

In the embodiment of the present disclosure, the first rendering module 910 is configured to:

acquire a sum vector of the direction vector of the preset light source and the direction vector of the view angle of the camera; obtain the half-angle vector by normalizing the sum vector.

In the embodiment of the present disclosure, the sine index is calculated by the following formula:

$$\sin(T,H) = \sqrt{1 - dot(T,H)^2}$$

where sin(T, H) denotes the sine index, T denotes the tangent vector, and H denotes the half-angle vector, dot(T, H) denotes a dot product of T and H.

In the embodiment of the present disclosure, the first rendering module 910 is configured to:

perform an exponentiation operation by using the sine index as a base number and using the highlight intensity corresponding to the specified pixel point as an exponent; determine a result of the exponentiation operation as the highlight color of each specified pixel point.

In the embodiment of the present disclosure, the result output module 940 is configured to:

obtain a first hybrid result by performing a weighted operation on the first rendered result and the second rendered result; obtain the final rendered result by performing a weighted operation on the first hybrid result and the third rendered result.

In the embodiment of the present disclosure, the result output module 940 is configured to:

obtain a second hybrid result by performing a weighted operation on the second rendered result and the third rendered result; obtain the final rendered result by performing a weighted operation on the second hybrid result and the first rendered result.

The specific details of each module in the above apparatus for rendering hair have been described in detail in the corresponding method for rendering hair, which will not be repeated herein.

It should be noted that although several modules or units of the device for performing actions are mentioned in the detailed description above, this division is not mandatory. In fact, according to the embodiments of the present disclosure, the features and functions of the two or more modules or units described above may be embodied in one module or unit. Conversely, the features and functions of one module or unit described above can be further divided into multiple modules or units to be embodied.

In addition, although the steps of the method in the present disclosure are described in the accompanying drawings in a specific sequence, this does not require or imply that these steps need to be performed according to the specific sequence, or all shown steps need to be performed to achieve an expected result. Additionally or alternatively, some steps may be omitted, a plurality of steps are combined into one step, and/or one step is decomposed into a plurality of steps for execution, and the like.

Through the description of the above embodiments, those skilled in the art can easily understand that the embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network, Including several instructions to enable a computing device (which may be a personal computer, a server, a touch terminal, or a network device, etc.) to execute the method according to the embodiments of the present disclosure.

The disclosure also provides a computer-readable storage medium. The computer-readable medium may be included in the electronic device described in the foregoing embodiments, or may exist alone and is not disposed in the electronic device.

The computer-readable storage medium may be, but not limited to, an electrical, magnetic, optical, electromagnetic, infrared, or semiconductor system, apparatus, or device, or any combination of the above. More specific examples of computer-readable storage media may include, but are not limited to: electrical connections with one or more wires, portable computer disks, hard disks, random access memory (RAM), read-only memory (ROM), erasable programmable read only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that contains or stores a program, and the program may be used by or in combination with an instruction execution system, apparatus, or device.

The computer-readable medium may transmit, propagate, or transmit a program used by or in combination with an instruction execution system, an apparatus, or a device. The program codes included in the computer-readable medium may be transmitted by any suitable medium. The suitable medium includes but is not limited to: a wire, an optical cable, an RF (radio frequency), or any suitable combination thereof.

The computer-readable medium carries one or more programs. When the one or more programs are executed by the one of the electronic devices, the electronic devices implement the methods described in the above embodiments.

In addition, an electronic device capable of implementing the above method is also provided in the embodiments of the present disclosure.

Those skilled in the art can understand that various aspects of the present disclosure can be implemented as a system, a method, or program product. Therefore, various aspects of the present disclosure may be specifically implemented in the form of: a complete hardware implementation, a complete software implementation (including firmware, microcode, etc.), or a combination of hardware and software implementations, which may be collectively referred to herein as "circuit", "module" or "system".

The electronic device 1000 according to this embodiment of the present disclosure will be described below with reference to FIG. 10. The electronic device 1000 shown in FIG. 10 is only an example, and should not imply any limitation to the functions and usage scope of the embodiments of the present disclosure.

Figure 10:
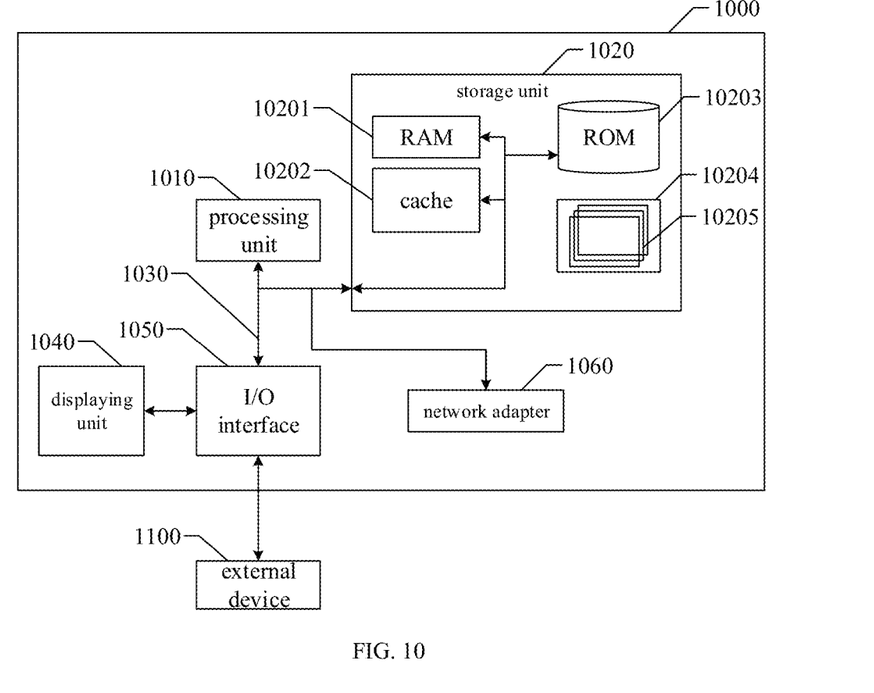
FIG. 10 shows a structure diagram of an electronic device in an embodiment of the present disclosure.

As shown in FIG. 10, the electronic device 1000 is represented in the form of a general-purpose computing device. Components of the electronic device 1000 may include, but are not limited to: at least one processing unit 1010, at least one storage unit 1020, a bus 1030 connecting different system components (including the storage unit 1020 and the processing unit 1010), a displaying unit 1040.

The storage unit stores a program code, and the program code may be executed by the processing unit 1010, so that the processing unit 1010 executes the steps described in the above-mentioned embodiment section of the specification according to various exemplary embodiments of the present disclosure. For example, the processing unit 1010 may perform the steps shown in FIG. 1: in step S110, a first rendered result is obtained by performing transparent channel test rendering on a specified pixel point in a hair model, the specified pixel point is a pixel point with a pixel depth value less than a preset depth threshold and a transparency channel value greater than a preset transparency threshold; in step S120, a second rendered result is obtained by performing transparent channel hybrid rendering on a backlight pixel point of the hair model based on the first rendered result; in step S130, a third rendered result is obtained by performing transparent channel hybrid rendering on a light-oriented pixel point of the hair model based on the second rendered result; in step S140, a final rendered result of the hair model is obtained by hybridizing the first rendered result, the second rendered result and the third rendered result.

The storage unit 1020 may include a readable medium in the form of a volatile storage unit, such as a random access storage unit (RAM) 10201 and/or a cache storage unit 10202, and may further include a read-only storage unit (ROM) 10203.

The storage unit 1020 may further include a program/utility tool 10204 having a set of (at least one) program modules 10205. Such program modules 10205 include but are not limited to an operating system, one or more application programs, other program modules, and program data, and each of these examples or some combination may include the implementation of the network environment.

The bus 1030 may be one or more of several types of bus structures, including a storage unit bus or a storage unit controller, a peripheral bus, a graphics acceleration port, a processing unit, or a local area bus using any of a variety of bus structures.

The electronic device 1000 may also communicate with one or more external devices 1100 (such as a keyboard, pointing device, Bluetooth device, etc.), and may also communicate with one or more devices that enable a user to interact with the electronic device 1000, and/or any device (e.g., a router, modem, etc.) that enables the electronic device 1000 to communicate with one or more other computing devices. Such communication may be performed through an input/output (I/O) interface 1050. Moreover, the electronic device 1000 may also communicate with one or more networks (such as a local area network (LAN), a wide area network (WAN), and/or a public network, such as the Internet) through the network adapter 1060. The network adapter 1060 can communicate with other modules of the electronic device 1000 through the bus 1030. It should be understood that although not shown in the figure, other hardware and/or software modules may be used in conjunction with the electronic device 1000, including but not limited to: a microcode, device driver, redundant processing unit, external disk drive array, RAID system, tape driver, data backup storage system and the like.

Those skilled in the art will readily contemplate other embodiments of the present disclosure taking into consideration the specification and practicing the invention disclosed herein. The present disclosure is intended to cover any variations, uses, or adaptations of this disclosure that conform to the general principles of this disclosure and include the common general knowledge or conventional technical means in the technical field not disclosed by this disclosure. The specification and examples are intended to be considered as exemplary only, and the protection scope and spirit of the disclosure are indicated by the following claims.

What is claimed is:

1. A method for rendering hair, performed by a server, comprising:
    establishing a hair model in 3D software, wherein the hair model comprises a light-oriented pixel point and a backlight pixel point, the light-oriented pixel point is a pixel point directly facing a preset light source in a virtual scene, the backlight pixel point is a pixel point facing away from the preset light source in the virtual scene, and each pixel point in the hair model contains a color value and a transparent channel value;
    obtaining a pixel depth value corresponding to each pixel point by rasterizing the hair model through a vertex shader;
    obtaining a first rendered result by performing transparent channel test rendering on a first specified pixel point in the hair model through a fragment shader, wherein the transparent channel test rendering comprises performing rendering on the first specified pixel point with the pixel depth value less than a preset depth threshold and the transparency channel value greater than a preset transparency threshold;
    obtaining a second rendered result by performing transparent channel hybrid rendering on the backlight pixel point of the hair model based on the first rendered result through the fragment shader;
    obtaining a third rendered result by performing transparent channel hybrid rendering on the light-oriented pixel point of the hair model based on the second rendered result through the fragment shader,
    wherein the transparent channel hybrid rendering comprises performing rendering on a second specified pixel point in the hair model, the second specified pixel point comprising the backlight pixel point or the light-oriented pixel point, and wherein the color value of the second specified pixel point is determined based on a following formula,
    current color value of the second specified pixel point * transparent channel value corresponding to the second specified pixel point+color value of the second specified pixel point determined by previous rendering result * (1-transparent channel value corresponding to the second specified pixel point); and
    obtaining a final rendered result of the hair model by hybridizing the first rendered result, the second rendered result and the third rendered result, wherein hybridizing the first rendered result, the second rendered result and the third rendered result comprises performing a weighted operation on the first rendered result, the second rendered result and the third rendered result, based on a preset weight.

2. The method according to claim 1, wherein obtaining the first rendered result by performing the transparent channel test rendering on the first specified pixel point in the hair model through the fragment shader, comprises:
    determining a half-angle vector according to a direction vector of the preset light source and a direction vector of a view angle of a camera, wherein the determining the half-angle vector according to the direction vector of the preset light source and the direction vector of the view angle of the camera, comprises:
        acquiring a sum vector of the direction vector of the preset light source and the direction vector of the view angle of the camera; and
        obtaining the half-angle vector by normalizing the sum vector;
    determining a sine index according to a tangent vector of the specified pixel point and the half-angle vector, wherein the sine index is calculated by a following formula:

$$\sin(T,H)=\sqrt{1-dot(T,H)^2}$$

where sin (T, H) denotes the sine index, T denotes the tangent vector, and H denotes the half-angle vector, dot (T, H) denotes a dot product of T and H;
    determining a highlight color of the specified pixel point according to the sine index and a highlight intensity corresponding to the specified pixel point, wherein the determining the highlight color of the specified pixel point according to the sine index and the highlight intensity corresponding to the specified pixel point comprises:
        performing an exponentiation operation by using the sine index as a base number and using the highlight intensity corresponding to the specified pixel point as an exponent; and
        determining a result of the exponentiation operation as the highlight color of the specified pixel point; and
    obtaining the first rendered result by performing transparent channel test rendering on the specified pixel point according to the highlight color through the fragment shader.

3. The method according to claim 1, wherein the obtaining the final rendered result by hybridizing the first rendered result, the second rendered result and the third rendered result comprises:
    obtaining a first hybrid result by determining a weighted sum of the first rendered result and the second rendered result based on the preset weight; and obtaining the final rendered result by determining a weighted sum of the first hybrid result and the third rendered result based on the preset weight.

4. The method according to claim 1, wherein obtaining the final rendered result by hybridizing the first rendered result, the second rendered result and the third rendered result comprises:
obtaining a second hybrid result by determining a weighted sum of the second rendered result and the third rendered result based on the preset weight; and
obtaining the final rendered result by determining a weighted sum of the second hybrid result and the first rendered result based on the preset weight.

5. The method according to claim 1, wherein obtaining the second rendered result by performing the transparent channel hybrid rendering on the backlight pixel point of the hair model based on the first rendered result through the fragment shader, comprises:
determining a half-angle vector according to a direction vector of the preset light source and a direction vector of a view angle of a camera, wherein the determining the half-angle vector according to the direction vector of the preset light source and the direction vector of the view angle of the camera, comprises:
acquiring a sum vector of the direction vector of the preset light source and the direction vector of the view angle of the camera; and
obtaining the half-angle vector by normalizing the sum vector;
determining a sine index according to a tangent vector of the backlight pixel point and the half-angle vector, wherein the sine index is calculated by a following formula:

$$\sin(T,H)=\sqrt{1-dot(T,H)^2}$$

where sin (T, H) denotes the sine index, T denotes the tangent vector, and H denotes the half-angle vector, dot (T, H) denotes a dot product of T and H;
determining a highlight color of the backlight pixel point according to the sine index and a highlight intensity corresponding to the backlight pixel point, wherein the determining the highlight color of the backlight pixel point according to the sine index and the highlight intensity corresponding to the backlight pixel point comprises:
performing an exponentiation operation by using the sine index as a base number and using the highlight intensity corresponding to the backlight pixel point as an exponent; and
determining a result of the exponentiation operation as the highlight color of the backlight pixel point; and
obtaining the second rendered result by performing transparent channel hybrid rendering on the backlight pixel point based on a following formula through the fragment shader:
the highlight color of the backlight pixel point * transparent channel value corresponding to the backlight pixel point+color value of the backlight pixel point determined by the first rendered result * (1-transparent channel value corresponding to the backlight pixel point).

6. The method according to claim 1, wherein obtaining the third rendered result by performing the transparent channel hybrid rendering on the light-oriented pixel point of the hair model based on the second rendered result through the fragment shader, comprises:
determining a half-angle vector according to a direction vector of the preset light source and a direction vector of a view angle of a camera, wherein the determining the half-angle vector according to the direction vector of the preset light source and the direction vector of the view angle of the camera, comprises:
acquiring a sum vector of the direction vector of the preset light source and the direction vector of the view angle of the camera; and
obtaining the half-angle vector by normalizing the sum vector;
determining a sine index according to a tangent vector of the light-oriented pixel point and the half-angle vector, wherein the sine index is calculated by a following formula:

$$\sin(T,H)=\sqrt{1-dot(T,H)^2}$$

where sin (T, H) denotes the sine index, T denotes the tangent vector, and H denotes the half-angle vector, dot (T, H) denotes a dot product of T and H;
determining a highlight color of the light-oriented pixel point according to the sine index and a highlight intensity corresponding to the light-oriented pixel point, wherein the determining the highlight color of the light-oriented pixel point according to the sine index and the highlight intensity corresponding to the light-oriented pixel point comprises:
performing an exponentiation operation by using the sine index as a base number and using the highlight intensity corresponding to the light-oriented pixel point as an exponent; and
determining a result of the exponentiation operation as the highlight color of the light-oriented pixel point; and
obtaining the third rendered result by performing transparent channel hybrid rendering on the light-oriented pixel point based on a following formula through the fragment shader:
the highlight color of the light-oriented pixel point * transparent channel value corresponding to the light-oriented pixel point+color value of the light-oriented pixel point determined by the second rendered result * (1-transparent channel value corresponding to the light-oriented pixel point).

7. An electronic device, wherein:
a processor; and
a memory for storing executable instructions of the processor;
wherein the processor is configured to
establish a hair model in 3D software, wherein the hair model comprises a light-oriented pixel point and a backlight pixel point, the light-oriented pixel point is a pixel point directly facing a preset light source in a virtual scene, the backlight pixel point is a pixel point facing away from the preset light source in the virtual scene, and each pixel point in the hair model contains a color value and a transparent channel value;
obtain a pixel depth value corresponding to each pixel point by rasterizing the hair model through a vertex shader;
obtain a first rendered result by performing transparent channel test rendering on a first specified pixel point in the hair model through a fragment shader, wherein the transparent channel test rendering comprises performing rendering on the first specified pixel point with the pixel depth value less than a preset depth threshold and the transparency channel value greater than a preset transparency threshold;

obtain a second rendered result by performing transparent channel hybrid rendering on the backlight pixel point of the hair model based on the first rendered result through the fragment shader;

obtain a third rendered result by performing transparent channel hybrid rendering on the light-oriented pixel point of the hair model based on the second rendered result through the fragment shader, wherein the transparent channel hybrid rendering comprises performing rendering on a second specified pixel point in the hair model, the second specified pixel point comprising the backlight pixel point or the light-oriented pixel point, and wherein the color value of the second specified pixel point is determined based on a following formula, current color value of the second specified pixel point * transparent channel value corresponding to the second specified pixel point+color value of the second specified pixel point determined by previous rendering result * (1-transparent channel value corresponding to the second specified pixel point); and obtain a final rendered result of the hair model by hybridizing the first rendered result, the second rendered result and the third rendered result, wherein hybridizing the first rendered result, the second rendered result and the third rendered result comprises performing a weighted operation on the first rendered result, the second rendered result and the third rendered result, based on a preset weight.

8. The electronic device according to claim 7, wherein the processor is further configured to:

determine a half-angle vector according to a direction vector of the preset light source and a direction vector of a view angle of a camera, wherein the processor is further configured to:

acquire a sum vector of the direction vector of the preset light source and the direction vector of the view angle of the camera; and obtain the half-angle vector by normalizing the sum vector;

determine a sine index according to a tangent vector of the specified pixel point and the half-angle vector of the specified pixel point, wherein the sine index is calculated by a following formula:

$$\sin(T,H)=\sqrt{1-dot(T,H)^2}$$

where sin (T, H) denotes the sine index, T denotes the tangent vector, and H denotes the half-angle vector, dot (T, H) denotes a dot product of T and H;

determine a highlight color of the specified pixel point according to the sine index and a highlight intensity corresponding to the specified pixel point, wherein the processor is further configured to:

perform an exponentiation operation by using the sine index as a base number and using the highlight intensity corresponding to the specified pixel point as an exponent; and determine a result of the exponentiation operation as the highlight color of the specified pixel point; and obtain the first rendered result by performing transparent channel test rendering on the specified pixel point according to the highlight color through the fragment shader.

9. The electronic device according to claim 7, wherein the processor is further configured to:

obtain a first hybrid result by determining a weighted sum of the first rendered result and the second rendered result based on the preset weight; and obtain the final rendered result by determining a weighted sum of the first hybrid result and the third rendered result based on the preset weight.

10. The electronic device according to claim 7, wherein the processor is further configured to:

obtain a second hybrid result by determining a weighted sum of the second rendered result and the third rendered result based on the preset weight; and obtain the final rendered result by determining a weighted sum of the second hybrid result and the first rendered result based on the preset weight.

11. The electronic device according to claim 7, wherein the processor is further configured to:

determine a half-angle vector according to a direction vector of the preset light source and a direction vector of a view angle of a camera, wherein the processor is further configured to:

acquire a sum vector of the direction vector of the preset light source and the direction vector of the view angle of the camera; and obtain the half-angle vector by normalizing the sum vector;

determine a sine index according to a tangent vector of the backlight pixel point and the half-angle vector, wherein the sine index is calculated by a following formula:

$$\sin(T,H)=\sqrt{1-dot(T,H)^2}$$

where sin (T, H) denotes the sine index, T denotes the tangent vector, and H denotes the half-angle vector, dot (T, H) denotes a dot product of T and H;

determine a highlight color of the backlight pixel point according to the sine index and a highlight intensity corresponding to the backlight pixel point, wherein the processor is further configured to:

perform an exponentiation operation by using the sine index as a base number and using the highlight intensity corresponding to the backlight pixel point as an exponent; and determine a result of the exponentiation operation as the highlight color of the backlight pixel point; and obtain the second rendered result by performing transparent channel hybrid rendering on the backlight pixel point based on a following formula through the fragment shader:

the highlight color of the backlight pixel point * transparent channel value corresponding to the backlight pixel point+color value of the backlight pixel point determined by the first rendered result * (1-transparent channel value corresponding to the backlight pixel point).

12. The electronic device according to claim 7, wherein the processor is further configured to:

determine a half-angle vector according to a direction vector of the preset light source and a direction vector of a view angle of a camera, wherein the processor is further configured to:

acquire a sum vector of the direction vector of the preset light source and the direction vector of the view angle of the camera; and obtain the half-angle vector by normalizing the sum vector;

determine a sine index according to a tangent vector of the light-oriented pixel point and the half-angle vector, wherein the sine index is calculated by a following formula:

$$\sin(T,H)=\sqrt{1-dot(T,H)^2}$$

where sin (T, H) denotes the sine index, T denotes the tangent vector, and H denotes the half-angle vector, dot (T, H) denotes a dot product of T and H;

determine a highlight color of the light-oriented pixel point according to the sine index and a highlight intensity corresponding to the light-oriented pixel point, wherein the processor is further configured to:
perform an exponentiation operation by using the sine index as a base number and using the highlight intensity corresponding to the light-oriented pixel point as an exponent; and
determine a result of the exponentiation operation as the highlight color of the light-oriented pixel point; and obtain the third rendered result by performing transparent channel hybrid rendering on the light-oriented pixel point based on a following formula through the fragment shader:

the highlight color of the light-oriented pixel point * transparent channel value corresponding to the light-oriented pixel point+color value of the light-oriented pixel point determined by the second rendered result * (1-transparent channel value corresponding to the light-oriented pixel point).

13. A non-transitory computer storage medium comprising computer program stored thereon, wherein when the computer program is executed by a processor, the processor is configured to:
establish a hair model in 3D software, wherein the hair model comprises a light-oriented pixel point and a backlight pixel point, the light-oriented pixel point is a pixel point directly facing a preset light source in a virtual scene, the backlight pixel point is a pixel point facing away from the preset light source in the virtual scene, and each pixel point in the hair model contains a color value and a transparent channel value;
obtain a pixel depth value corresponding to each pixel point by rasterizing the hair model through a vertex shader;
obtain a first rendered result by performing transparent channel test rendering on a first specified pixel point in the hair model through a fragment shader, wherein the transparent channel test rendering comprises performing rendering on the first specified pixel point with the pixel depth value less than a preset depth threshold and the transparency channel value greater than a preset transparency threshold;
obtain a second rendered result by performing transparent channel hybrid rendering on the backlight pixel point of the hair model based on the first rendered result through the fragment shader;
obtain a third rendered result by performing transparent channel hybrid rendering on the light-oriented pixel point of the hair model based on the second rendered result through the fragment shader,
wherein the transparent channel hybrid rendering comprises performing rendering on a second specified pixel point in the hair model, the second specified pixel point comprising the backlight pixel point or the light-oriented pixel point, and wherein the color value of the second specified pixel point is determined based on a following formula, current color value of the second specified pixel point * transparent channel value corresponding to the second specified pixel point+color value of the second specified pixel point determined by previous rendering result * (1-transparent channel value corresponding to the second specified pixel point); and obtain a final rendered result of the hair model by hybridizing the first rendered result, the second rendered result and the third rendered result, wherein hybridizing the first rendered result, the second rendered result and the third rendered result comprises performing a weighted operation on the first rendered result, the second rendered result and the third rendered result, based on a preset weight.

14. The non-transitory computer storage medium according to claim 13, wherein the processor is further configured to:
determine a half-angle vector according to a direction vector of the preset light source and a direction vector of a view angle of a camera, wherein the processor is further configured to:
acquire a sum vector of the direction vector of the preset light source and the direction vector of the view angle of the camera; and
obtain the half-angle vector by normalizing the sum vector;
determine a sine index according to a tangent vector of the specified pixel point and the half-angle vector, wherein the sine index is calculated by a following formula:

$$\sin(T,H)=\sqrt{1-dot(T,H)^2}$$

where sin (T, H) denotes the sine index, T denotes the tangent vector, and H denotes the half-angle vector, dot (T, H) denotes a dot product of T and H;
determine a highlight color of the specified pixel point according to the sine index and a highlight intensity corresponding to the specified pixel point, wherein the processor is further configured to:
perform an exponentiation operation by using the sine index as a base number and using the highlight intensity corresponding to the specified pixel point as an exponent; and
determine a result of the exponentiation operation as the highlight color of the specified pixel point; and
obtain the first rendered result by performing transparent channel test rendering on the specified pixel point according to the highlight color through the fragment shader.

15. The non-transitory computer storage medium according to claim 13, wherein the processor is further configured to:
obtain a first hybrid result by determining a weighted sum of the first rendered result and the second rendered result based on the preset weight; and
obtain the final rendered result by determining a weighted sum of the first hybrid result and the third rendered result based on the preset weight.

16. The non-transitory computer storage medium according to claim 13, wherein the processor is further configured to:
obtain a second hybrid result by determining a weighted sum of the second rendered result and the third rendered result based on the preset weight; and obtain the final rendered result by determining a weighted sum of the second hybrid result and the first rendered result based on the preset weight.

17. The non-transitory computer storage medium according to claim 13, wherein the processor is further configured to:
determine a half-angle vector according to a direction vector of the preset light source and a direction vector of a view angle of a camera, wherein the processor is further configured to:
acquire a sum vector of the direction vector of the preset light source and the direction vector of the view angle of the camera; and
obtain the half-angle vector by normalizing the sum vector;
determine a sine index according to a tangent vector of the backlight pixel point and the half-angle vector, wherein the sine index is calculated by a following formula:

$$\sin(T,H) = \sqrt{1 - dot(T,H)^2}$$

where sin (T, H) denotes the sine index, T denotes the tangent vector, and H denotes the half-angle vector, dot (T, H) denotes a dot product of T and H;
determine a highlight color of the backlight pixel point according to the sine index and a highlight intensity corresponding to the backlight pixel point, wherein the processor is further configured to:
perform an exponentiation operation by using the sine index as a base number and using the highlight intensity corresponding to the backlight pixel point as an exponent; and
determine a result of the exponentiation operation as the highlight color of the backlight pixel point; and
obtain the second rendered result by performing transparent channel hybrid rendering on the backlight pixel point based on a following formula through the fragment shader:
the highlight color of the backlight pixel point * transparent channel value corresponding to the backlight pixel point+color value of the backlight pixel point determined by the first rendered result * (1-transparent channel value corresponding to the backlight pixel point).

18. The non-transitory computer storage medium according to claim 13, wherein the processor is further configured to:
determine a half-angle vector according to a direction vector of the preset light source and a direction vector of a view angle of a camera, wherein the processor is further configured to:
acquire a sum vector of the direction vector of the preset light source and the direction vector of the view angle of the camera; and
obtain the half-angle vector by normalizing the sum vector;
determine a sine index according to a tangent vector of the light-oriented pixel point and the half-angle vector, wherein the sine index is calculated by a following formula:

$$\sin(T,H) = \sqrt{1 - dot(T,H)^2}$$

where sin (T, H) denotes the sine index, T denotes the tangent vector, and H denotes the half-angle vector, dot (T, H) denotes a dot product of T and H;
determine a highlight color of the light-oriented pixel point according to the sine index and a highlight intensity corresponding to the light-oriented pixel point, wherein the processor is further configured to:
perform an exponentiation operation by using the sine index as a base number and using the highlight intensity corresponding to the light-oriented pixel point as an exponent; and
determine a result of the exponentiation operation as the highlight color of the light-oriented pixel point; and
obtain the third rendered result by performing transparent channel hybrid rendering on the light-oriented pixel point based on a following formula through the fragment shader:
the highlight color of the light-oriented pixel point * transparent channel value corresponding to the light-oriented pixel point+color value of the light-oriented pixel point determined by the second rendered result * (1-transparent channel value corresponding to the light-oriented pixel point).

* * * * *